(12) United States Patent
Hendrickson et al.

(10) Patent No.: US 9,433,914 B2
(45) Date of Patent: Sep. 6, 2016

(54) POLYOLEFIN REACTOR SYSTEM HAVING A GAS PHASE REACTOR

(71) Applicant: Chevron Phillips Chemical Company, LP, The Woodlands, TX (US)

(72) Inventors: Gregory G. Hendrickson, Kingwood, TX (US); Leonard E. Powell, Deweyville, TX (US); Michael A. Rhodes, Port Arthur, TX (US); Joel Mutchler, Kingwood, TX (US); Bruce E. Kreischer, Kingwood, TX (US); Maruti Bhandarker, Kingwood, TX (US); Rebecca A. Gonzales, Houston, TX (US); Bruce H. Marantis, Humble, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 200 days.

(21) Appl. No.: 14/136,868

(22) Filed: Dec. 20, 2013

(65) Prior Publication Data

US 2015/0175719 A1    Jun. 25, 2015

(51) Int. Cl.
*B01J 19/24* (2006.01)
*B01J 8/24* (2006.01)
*C08F 2/34* (2006.01)
(Continued)

(52) U.S. Cl.
CPC ........... *B01J 19/0033* (2013.01); *B01J 8/0055* (2013.01); *B01J 8/1809* (2013.01); *B01J 8/1863* (2013.01); *C08F 10/02* (2013.01); *B01J 2208/00734* (2013.01); *B01J 2208/00991* (2013.01); *B01J 2219/002* (2013.01); *B01J 2219/00103* (2013.01); *B01J 2219/00108* (2013.01); *B01J 2219/00186* (2013.01); *B01J 2219/00202* (2013.01); *B01J 2219/00213* (2013.01); *B01J 2219/00231* (2013.01); *B01J 2219/00236* (2013.01);
(Continued)

(58) Field of Classification Search
CPC ...... C08F 2/002; C08F 2/34; C08F 2410/05; B01J 2208/00734; B01J 8/1809
USPC ...................................... 526/59, 74; 422/105
See application file for complete search history.

(56) References Cited

U.S. PATENT DOCUMENTS 4,803,251 A    2/1989    Goode et al.
4,876,320 A    10/1989    Fulks et al.
(Continued)

FOREIGN PATENT DOCUMENTS

EP        0811638 A2 *   12/1997
WO       2012151663        11/2012

OTHER PUBLICATIONS

Author—David R. Day, Ph.D., Title of Article—New Process Instrumentation for Metallocene-based Resin Production, Title of Publication—Metallocenes Asia 97—Proceedings of 4th International Congress on Metallocenes Polymers, May 15-16, 1997 Singapore, pp. 209-226, Publication Date—1997, Publisher—Schotland Business Research, Inc., Place of Publication—USA.†

*Primary Examiner* — Fred M Teskin
(74) *Attorney, Agent, or Firm* — Sutherland Asbill & Brennan LLP

(57) ABSTRACT

A system and method for polymerizing olefin in a gas phase reactor into a polyolefin in presence of catalyst, measuring static charge in the reactor system; determining an indication of polyolefin fines in the reactor system, and adjusting operation of the reactor system in response to the indication.

19 Claims, 6 Drawing Sheets

(51) Int. Cl.
  *C08F 10/02* (2006.01)
  *B01J 19/00* (2006.01)
  *B01J 8/18* (2006.01)
  *B01J 8/00* (2006.01)

(52) U.S. Cl.
  CPC ............ *B01J 2219/00238* (2013.01); *B01J 2219/00268* (2013.01); *B01J 2219/00272* (2013.01)

(56) References Cited

U.S. PATENT DOCUMENTS

| | | | |
|---|---|---|---|
| 5,026,795 A * | 6/1991 | Hogan | C08F 2/005 526/106 |
| 5,648,581 A | 7/1997 | Kubo et al. | |
| 5,965,675 A | 10/1999 | Kellum et al. | |
| 5,969,061 A * | 10/1999 | Wonders | B01J 8/005 526/66 |
| 6,008,662 A | 12/1999 | Newton et al. | |
| 6,096,840 A | 8/2000 | Bernier et al. | |
| 6,111,034 A | 8/2000 | Goode et al. | |
| 6,548,610 B2 | 4/2003 | Bartilucci et al. | |
| 6,831,140 B2 | 12/2004 | Muhle et al. | |
| 6,858,684 B2 | 2/2005 | Burdett et al. | |
| 6,905,654 B2 | 6/2005 | Bartilucci et al. | |
| 6,960,549 B2 | 11/2005 | Wenzel et al. | |
| 7,307,130 B2 | 12/2007 | Patrick et al. | |
| 7,799,876 B2 | 9/2010 | Markel et al. | |
| 7,985,811 B2 | 7/2011 | Hagerty et al. | |
| 8,124,696 B2 | 2/2012 | Savatsky et al. | |
| 8,420,733 B2 | 4/2013 | Stakem et al. | |
| 8,433,433 B2 | 4/2013 | Khakhalev | |
| 2002/0065377 A1 | 5/2002 | Bartilucci et al. | |
| 2003/0114609 A1 | 6/2003 | Samson | |
| 2005/0148742 A1 * | 7/2005 | Hagerty | B01J 8/1809 526/68 |
| 2011/0256632 A1 | 10/2011 | Hussein et al. | |
| 2012/0283395 A1 | 11/2012 | Hendrickson | |
| 2012/0309910 A1 | 12/2012 | Dewachter et al. | |

\* cited by examiner
† cited by third party

POLYOLEFIN REACTOR SYSTEM HAVING A GAS PHASE REACTOR

BACKGROUND

1. Field of the Invention

The present invention relates generally to a polyolefin reactor system having a gas phase reactor and, more particularly, to managing polymer fines and catalyst in the polyolefin reactor system having a gas phase reactor.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into everyday items. Polyolefin polymers such as polyethylene, polypropylene, and their copolymers, are used for various films, piping, retail and pharmaceutical packaging, food and beverage packaging, plastic bags, toys, carpeting, various industrial products, automobile components, appliances and other household items, and so forth.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements such as thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the short-chain olefin molecules (monomers and comonomers), such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor. As polymer chains develop during polymerization in the reactor, solid particles known as "fluff" or "flake" or "powder" are produced in the reactor.

The fluff may possess one or more melt, physical, rheological, and/or mechanical properties of interest, such as density, melt index (MI), melt flow rate (MFR), comonomer content, molecular weight, crystallinity, and so on. Different properties for the fluff may be desirable depending on the application to which the polyolefin fluff or subsequently pelletized polyolefin is to be applied. Selection and control of the reaction conditions within the reactor, such as temperature, pressure, chemical concentrations, polymer production rate, catalyst type, catalyst system including cocatalyst, and so forth, may affect the fluff properties.

In addition to the one or more olefin monomers, a catalyst (e.g., Ziegler-Natta, metallocene, chromium-based, post-metallocene, nickel, etc.) for facilitating the polymerization of the monomers may be added to the reactor. For example, the catalyst may be a particle added via a reactor feed stream or recycle stream and, once added, suspended in the fluid medium within the reactor. Unlike the monomers, catalysts are generally not consumed in the polymerization reaction. Further, as appreciated by the skilled artisan, the catalyst particle morphology may be supported or unsupported.

The polymerization may be performed in a single reactor or in multiple reactors in series and/or parallel. For example, one or more liquid phase (e.g. loop slurry) reactors or one or more gas phase (e.g. fluidized bed) reactors, or combinations thereof, may be employed. The product discharge from the reactor or reactors generally contains the desired polyolefin fluff. The polyolefin fluff may be further processed to deactivate residual catalyst and remove non-polymer components. The polyolefin fluff may be sent to the customer in a non-pelletized form, or pelletized in an extruder and sent to the customer in pellet form.

In the case of a fluidized-bed gas phase reactor employed to polymerize olefin into polyolefin, the generation of polyolefin polymer having very small particle diameter, i.e., labeled as polymer "fines," can complicate operation of the reactor and associated equipment. Indeed, the presence of polymer fines over time can result in fouling or plugging of the reactor and associated equipment.

SUMMARY OF THE INVENTION

An aspect of the invention relates to a method of operating a reactor system having a gas phase reactor, the method including: polymerizing olefin in the gas phase reactor into a polyolefin in presence of catalyst; measuring static charge in the reactor system; assessing, via a control system, polyolefin fines accumulation in the reactor system based at least on the measured static charge; and adjusting operation of the reactor system in response to the determination.

Another aspect of the invention relates to a method of operating a polyolefin reactor system having a gas phase reactor, the method including: polymerizing olefin in the gas phase reactor in presence of a first catalyst system; determining via a control system an indication of polyolefin fines in the reactor system, wherein determining includes measuring static charge in the reactor system via static probes disposed in the reactor system; and adjusting operation of the reactor system in response to the indication of polyolefin fines.

Yet another aspect of the invention relates to a polyolefin reactor system including: a gas phase reactor configured to polymerize olefin into a polyolefin in presence of a catalyst; a static charge probe configured to measure static electricity in the gas phase reactor; and a control system configured to determine polyolefin fines accumulation in the gas phase reactor based on the measured static electricity. The control system is configured to adjust an addition rate of antistat to the gas phase reactor in response to the determination.

Yet another aspect of the invention relates to a reactor system having: a gas phase reactor configured to polymerize olefin into a polyolefin in presence of a catalyst; an overhead system configured to receive overhead gas from the gas phase reactor, the overhead gas having entrained polyolefin fines from the gas phase reactor; a plurality of static charge probes configured to measure static charge at different locations in the reactor system; and a control system configured to detect polyolefin fines accumulation in the reactor system based on the measured static charge, and the control system configured to adjust an addition rate of antistat to the reactor system in response to the detecting polyolefin fines accumulation.

BRIEF DESCRIPTION OF THE DRAWINGS

Advantages of the invention may become apparent to one of skill in the art upon reading the following detailed description and upon reference to the drawings in which.

DETAILED DESCRIPTION OF SPECIFIC EMBODIMENTS

Figure 1:
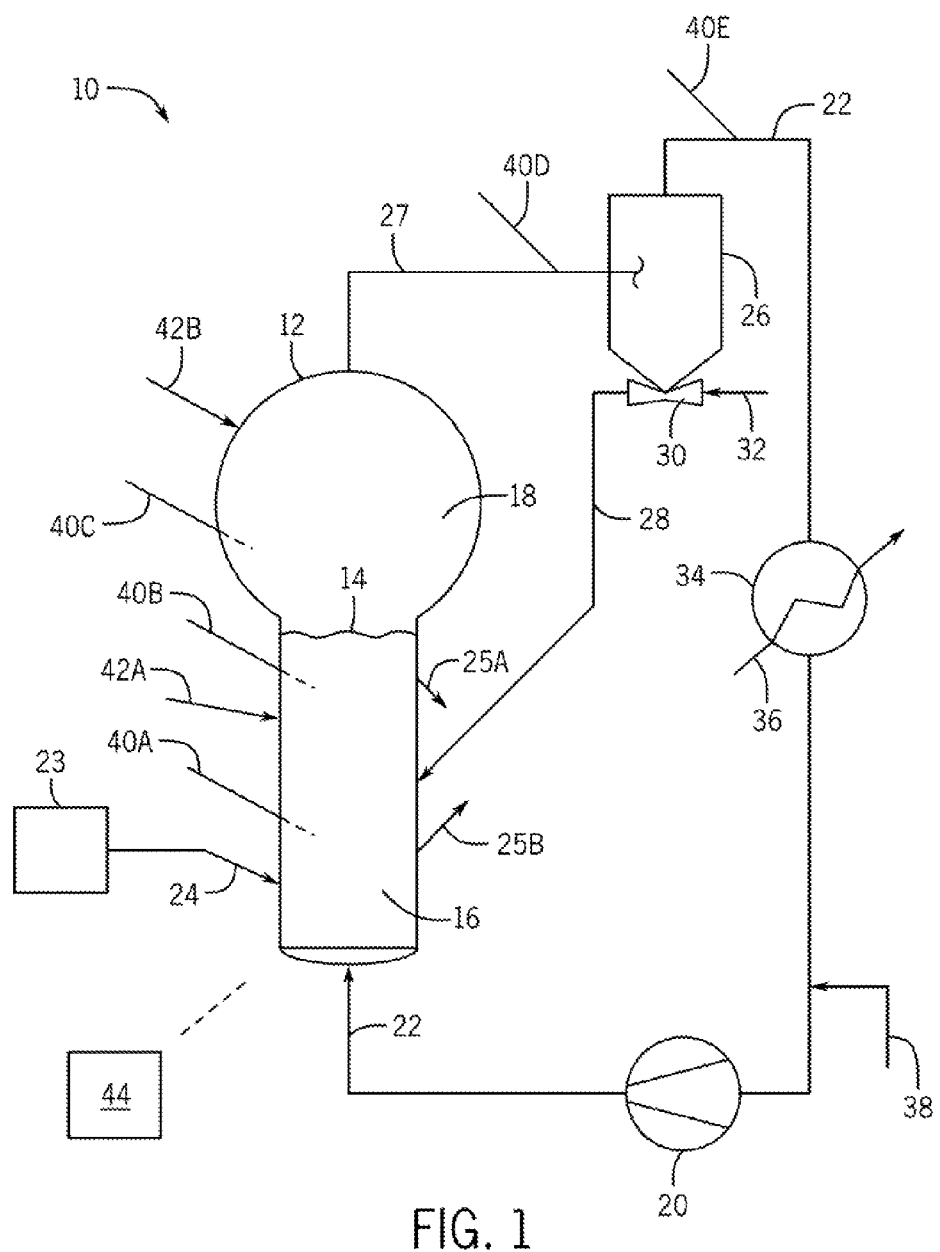
FIG. 1 is a simplified process flow diagram depicting an exemplary gas phase reactor system for polymerizing olefin into polyolefin in accordance with embodiments of the present techniques.

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

Embodiments of the present techniques are directed to managing polymer fines in a polyolefin gas phase reactor. In certain embodiments, polymer fines may be defined as polyolefin particles having a particle size of less than 100 microns or less than 200 microns, for example. In other embodiments, fines may be defined by the amount of fines for a given mesh size and/or collected on the pan in particle size analysis. For example, the amount or percent of fines may be the amount (percent) of particles collected on the bottom pan in a particle size (distribution) analysis, or the amount or percent of particles collected on a 200 mesh screen plus the pan in the analysis, and so forth.

The presence or anticipated presence of excessive fines or excessive fines accumulation in the gas phase reactor and associated equipment may be determined by operating experience, catalyst type or catalyst system including cocatalyst, static probe measurements, and so forth. In the case of static probes (i.e., static charge probes), a measurement of increased static charge or of static disturbances may indicate the presence of increased fines or that the amount of fines will increase, and/or that problems with fines such as sheeting may occur. In response to a determination of excessive fines or excessive fines accumulation, or that fines will increase or that operating problems associated with fines may occur, the operation of the gas phase reactor may be adjusted to reduce the amount of fines or anticipated fines, and/or to avoid or mitigate problems associated with the presence of fines. Such adjustments may include modulating the addition of an antistatic compound ("antistat") generally and/or at particular locations across the reactor or reactor system. Other adjustments may include manipulating the ratio of product withdrawal rate between upper and lower product withdrawal locations across the fluidized bed in the reactor. Additional adjustments may include changes to reactor and reactor-system operating conditions such as the fluidization velocity, temperature, and other conditions.

One or more static probes may be disposed across the gas phase reactor and/or along the overhead of the gas phase reactor, for example. Operating experience and space-charge density calculations may specify responsive locations for the static probes. In one example, a static probe is disposed in the disengagement section and shown via operating experience to give responsive static measurement indicating fines. In another example, a static probe is disposed in an upper portion of the reaction section to measure static in the top portion (e.g., top one foot) of the fluidized bed. Calculations show a relatively high space-charge density in this upper portion of the fluidized bed result in the static measurements being more responsive to the presence and anticipation of increased or excess fines. Such is confirmed via operating experience. In general, static-probe locations are selected to give static (i.e., static charge or static electricity) measurements better indicating and anticipating problematic fines.

Further, the potential presence of excessive fines may also be anticipated in polyolefin grade transitions to product grades employing catalysts giving more fines. Such expectation of increased or excessive fines may be based on operating experience with the catalyst type, and/or based on catalyst properties (e.g., morphology, catalyst particle size, activity, etc.) of the catalyst type. Further, the catalyst system including the cocatalyst may be considered.

Again, in response to the determined presence or anticipated presence of excessive fines, whether determined by static measurement or catalyst type, for instance, the reactor operating conditions may be modified to lower the fines and/or the addition rate of anti-static agent to the reactor may be increased to reduce fines accumulation or reduce problems (e.g., sheeting) associated with fines. Moreover, more than one addition point for antistat to the reactor may be employed, and the antistat addition rate increased to portions of the reactor containing excessive fines or where there are anticipated problems due to fines. The addition of antistat can reduce the rate of accumulation of fines in certain areas of the reactor, such as on the reactor walls, and so on.

Operating conditions of the gas phase reactor may be adjusted to reduce the presence or problems of fines. For example, with problems of excessive fines in the reactor overhead system, such as with plugging of the overhead cyclone and/or downstream loop gas cooler, the fluidization velocity in the gas phase reactor may be reduced so that less fines are carried over into the overhead from the gas phase reactor. On the other hand, for instance, the fluidization velocity may be increased in an effort to reduce sheeting or adhering of polyolefin to the inner wall of the reactor. Also, the reactor temperature may be decreased to reduce sheeting or fouling in the reactor and/or downstream equipment.

In other embodiments, problems of excessive fines in the reactor or reactor overhead system may be addressed by adjusting the withdrawal ratio between upper and lower product withdrawals from the gas phase reactor to increase rate of fines withdrawal from the reactor in the polyolefin fluff product. Such adjustment of the ratio of withdrawal rates between product withdrawal locations may also impact behavior of the fluidized bed such that catalyst particles remain in the bed longer with increased residence time giving larger polyolefin particle size and thus a reduction in fines.

Lastly, a new delivery or supply system (e.g., FIG. 6) to feed catalyst to the gas phase reactor is disclosed herein. Two catalyst feed vessels are employed, a primary catalyst feed vessel and an intermediate catalyst feed vessel. Advantageously, during transitions from a first catalyst type to a second catalyst type, the intermediate vessel may feed the second catalyst type to the reactor while the primary vessel is emptied of the first catalyst type and filled with the second catalyst type. Thus, the gas phase reactor system may remain online during the catalyst transition. By remaining online, the amount of off-spec polyolefin production may be reduced and also having to take the reactor off-line and re-start the reactor is avoided.

In operation, contents from the primary catalyst feed vessel are transferred to a storage vessel, and once the primary catalyst feed vessel is emptied or near emptied, the catalyst being fed from the intermediate catalyst feed vessel is transferred to the primary catalyst feed vessel. After catalyst has been transferred from the intermediate catalyst feed vessel to the primary catalyst feed vessel, catalyst feed is established from the primary catalyst feed vessel to the reactor. Beneficially, the on-time stream factor of the reactor may be increased, off-spec production reduced, and/or maintenance costs reduced. Alternatively, a slurry catalyst feed may be utilized where the catalyst is diluted and pumped to the reactor with a positive displacement pump.

In general, a polymerization reactor system may have at least one gas phase reactor. Such systems may employ a continuous recycle stream (loop gas) containing one or more monomers continuously cycled through a fluidized bed in the presence of the catalyst under polymerization conditions in the reactor. The recycle stream may be withdrawn from the fluidized bed and recycled back into the reactor. Simultaneously, polyolefin polymer product may be withdrawn from the reactor and new or fresh monomer may be added to replace the polymerized monomer. Further, more than one gas phase reactor and/or liquid-phase reactors may be employed in a polymerization reactor system, operated in series or parallel.

A fluidized-bed gas phase reactor for polyolefin production may generally have a reaction zone and a disengagement zone. In examples, the reaction zone has a diameter-to-height ratio of about 6-7.5 and the disengagement zone may have a diameter-to-height ratio of about 1-2. Of course, gas phase reactors having other diameter-to-height ratios for the reaction zone and disengagement zone may be employed.

To maintain a viable fluidized bed (of polyolefin particles and catalyst), superficial flow through the bed may be about 2-6 times the flow for fluidization. It is generally beneficial that the bed contain polymer particles (as opposed to only catalyst, for example) to reduce the formation of localized "hot spots" and to entrap and distribute the typically powdery catalyst.

On startup of the reactor, the reaction zone may be generally charged with a quantity of polymer particles before gas flow is initiated. Monomer (e.g., ethylene gas) may be fed to a compressor inlet for introduction and recirculation through the reactor. Comonomer (e.g., alpha-olefin comonomer such as 1-butene or 1-hexene) may be added via the compressor or directly to a reactor inlet. The catalyst may be stored in a catalyst feed vessel under an inert gas (e.g., under a nitrogen blanket) and added to the reactor. In all, fluidization in the reactor may be achieved by a relatively high rate of gas recycle via the compressor to and through the bed, typically in the order of about up to 50 times or greater the make-up gas feed rate. In certain examples, a gas analyzer, positioned above the bed on the reactor or on the recycle stream piping, determines the composition of the gas being recycled. In response to the measured recycled-gas composition, the make-up gas composition may be adjusted accordingly to maintain an essentially steady-state gaseous composition with the reaction zone.

As mentioned, the present techniques may be used to trend and control polyolefin fines (very small particles) in a polyolefin fluidized-bed gas phase reactor. In examples, static probes are position across the reactor and the reactor overhead system. As introduced above, the one or more probes may measure static charge or static electricity, which may be correlated to the presence or amount of polyolefin fines, as well as to the onset of problems symptomatic of the presence of fines. Addition of an antistatic compound at various locations across the reactor may decrease the fines concentration in that location and mitigate problems associated with the fines. In examples, the antistat can be added using n-pentane as a carrier and nitrogen as the driving force, for instance. Moreover, the withdrawal ratio between an upper and lower location for polyolefin product removal from the reactor can impact the concentration of fines in the reactor because of residence time variation in the reactor.

Operating conditions and processes of gas phase reactors can produce fines within a gas phase polymerization unit. Fines produced with the process are generally carried into the upper section of the reactor. Some fines exit the reactor through the main loop gas overhead piping while other fines settle on the reactor dome walls. A certain percentage of fines that exit the reactor may be captured via cyclones, for example, and transferred back into the reactor fluidized bed via a motive gas stream flowing through an ejector or eductor located at the bottom of the cyclone cone section.

The cyclones and associated fines recovery system may not collect all of the fines carried overhead. Consequently, an increase in fines may impact downstream equipment such as downstream heat exchangers which may need frequent cleaning (of the exchangers), resulting in a reactor shutdown. An increase in fines that exceeds beyond the removal and displacement capability of the overhead cyclone recovery system may result in the plugging of a cyclone and/or fouling of the downstream heat exchanger, for example, causing a reactor shutdown which can run into several days of loss production and associated maintenance costs.

As indicated, increased fines within the reactor may give the buildup of fines on the reactor dome walls. This buildup can result in the melting or sintering of fines on the walls of the reactor. Unfortunately, the sintered materials may form sheets which break free from the reactor walls and collect at the bottom portion (e.g. at the distribution plate) of the reactor. A shutdown of the reactor for cleaning may be required, as in the case of cyclone plugging or cooler fouling.

The present techniques may involve trending and adjusting reactor variables to reduce the occurrence of the foregoing adverse events related to excessive fines production and the associated undesired shutdown of the reactor system. Again, embodiments may include static charge measuring devices (e.g., static probes) strategically located within the reactor system to facilitate the monitoring of static electricity. Control of the static charge within the reactor may prevent or reduce fines from adhering to the reactor dome walls and thus advantageously decrease sheeting. The techniques may include adding an antistatic agent or compound ("antistat") to the reactor at various locations. In certain embodiments the antistat is added using an inert hydrocarbon carrier (e.g., n-pentane, iso-pentane, etc.) as a carrier. Nitrogen or a metering pump, for instance, may provide the driving force to feed the antistat. The antistat may be added to decrease the accumulation of fines and % or to reduce problems (e.g., sheeting) associated with the presence of fines.

Surprisingly, the measurements obtained from the static probes may be correlated to the conditions in the reactor and, therefore, used as a basis to adjust reactor temperature and fluidization velocity to reduce fouling in the reactor and associated equipment caused by the presence of polymer fines. Beneficially, the on-time stream factor of the reactor may be increased and maintenance costs reduced.

Further, as mentioned, embodiments may include adjusting the withdrawal ratio between upper and lower product withdrawal locations. Such adjustment of the ratio can impact the amount of fines by altering the residence time of catalyst within the reactor. An increased amount of catalyst residence time may reduce the amount of fines. Moreover, strategic placement of the withdrawal locations can reduce the amount of fines in the reactor.

Lastly, with regard to new catalyst feed techniques (e.g., FIGS. 6 and 7), the catalyst feed system to a gas phase polymerization may include an intermediate catalyst feed vessel and a primary catalyst feed vessel, multiple cycling valves, feed lines, and nitrogen or an inert fluid line for catalyst transfer to the gas phase reactor. During transitions between catalysts, the reactor system including the gas phase reactor may remain online by the manipulation of a different catalyst type being fed to the reactor from the intermediate catalyst feed vessel bypassing the primary catalyst feed vessel. By remaining online, the amount of off-spec polyolefin production may be significantly reduced and the risks associated with a reactor restart avoided.

FIG. 1 is a gas-phase reactor system 10 for polyolefin production. The reactor system 10 includes a gas phase reactor 12 configured to operate with a fluidized bed 14 of polyolefin particles and a relatively small amount of catalyst particles. The polyolefin particles may generally grow in size as the polymerization proceeds. The gas phase reactor 12 has a reaction zone 16 and a disengagement zone 18. The fluidized bed 14 is generally formed in the reaction zone 16. Fluidization gas generally disengages from the solid particles in the disengagement zone 18.

As mentioned, the reaction zone 16 may have an exemplary diameter-to-height ratio of about 6-7.5 and the disengagement zone 18 may have an exemplary diameter-to-height ratio of about 1-2. A gas phase reactor 12 having other diameter-to-height ratios for the reaction zone 16 and disengagement zone 18 may be employed. The particular dimensions of the reaction zone 16 and disengagement zone 18 may impact residence time in the reactor 12.

A loop compressor 20 provides a loop gas 22 as the fluidization gas to the reactor 12. The loop gas 22 also facilitates heat removal generated in the polymerization reactor. The loop gas 22 may enter a bottom portion of the reactor 12 via one or more inlets to provide for fluidization of the fluidized bed 14 The loop gas 22 may flow through and/or around one or more internals (not shown) inside the reactor 12 and facilitate formation and maintaining of the fluidized bed 14.

Further, the entering loop gas 22 may generally contain the reactants (e.g., monomer and comonomer) for the polymerization. The loop gas 22 may include an inert gas (e.g., nitrogen), monomer (e.g. ethylene, propylene, etc.), any comononer, and optionally condensable components (e.g., i-pentane, n-pentane, n-hexane, etc.). Examples of comonomer include 1-hexene or 1-butene in polyethylene production, ethylene in polypropylene production, and so forth.

In the reactor 12, the monomer and any comonomer are polymerized into a polyolefin. Catalyst 24 is added from a catalyst system 23 (e.g., FIG. 6) to the reactor 12 to facilitate the polymerization. As discussed below, inert gas (e.g., nitrogen) supply pressure may drive addition of the catalyst 24 to the reactor 12. Examples of catalysts include Ziegler-Natta, metallocene, chromium-based, post-metallocene, nickel, unsupported catalysts, supported catalysts, and so forth. In addition to or in lieu of the catalyst 24 addition, a stream (not shown) of polyolefin particles having residual active catalyst may be added from an upstream polymerization reactor (e.g., another gas phase reactor, a loop reactor, a pre-polymerization, etc.) to the reactor 12 for further polymerization in the reactor 12. Further, cocatalyst may be added to increase the rate of polymerization.

Polyolefin product particles are removed from the reactor 12 via one or more product take-offs 25A, 25B which each may employ a lock hopper configuration, for example. In the illustrated embodiment, an upper product take-off 25A is disposed to remove polyolefin from an upper portion of the fluidized bed 14, and a lower product take-off 25B is disposed to remove polyolefin from a lower portion of the fluidized bed 14. More than two product-takeoffs may be employed.

As mentioned, the fluidization gas (loop gas) disengages from the solid polyolefin in the disengagement zone 18. A mixture 27 of the loop gas and carryover of small polyolefin particles (i.e., fines) exit overhead from the gas-phase reactor 12. The discharged mixture 27 enters one or more cyclones 26 where loop gas 22 exits overhead and the fines 28 discharge from the bottom of the cyclone and are returned to reactor 12. In the illustrated embodiment, a motive device 30 (e.g., eductor, ejector, etc.) and motive gas 32 (e.g., a slip stream of loop gas or a dedicated gas) facilitate the return and introduction of the fines 28 to the reactor 12. Thus, the fines 28 stream may include the motive gas 32.

The loop gas 22 exiting overhead from the cyclone 22 may be routed through a heat exchanger 34 (e.g., a shell-and-tube heat exchanger) to cool the loop gas 22 and remove the heat of polymerization from the loop gas 22. The cooling medium 36 on the utility side of the heat exchanger 34 may be water such as treated water or cooling tower water, or a cooling medium other than water.

Some components (e.g., n-pentane) in the loop gas 22 may be condensed via the heat exchanger 34, and the condensed components or condensate separated from the loop gas and returned via a pump (not shown) to the reactor 12. The condensate may vaporize in the reactor 12 providing for latent heat removal. In alternate embodiments, the heat exchanger 34 may be disposed downstream of the compressor 20, the condensed components or condensate may enter the reactor with the loop gas 22, and so forth.

The compressor 20 drives the cooled loop gas 22 to the bottom portion of the reactor 12. One or more makeup 38 streams may be added to the circulating loop gas 22 or directly to the reactor 12. The makeup 38 streams may include monomer, comonomer, inert gas, and so forth. Typically, the makeup 38 includes monomer (and comonomer if used) to replace the monomer (and comonomer) consumed in the polymerization in the reactor 12. An online gas analyzer (not shown) may be disposed to measure the composition of the loop gas 22 in the circuit (e.g., such as in the overhead stream from the cyclone 26). In response to the measured composition of the loop gas 22, the amount of each component added in the makeup 38 may be adjusted to give or maintain a composition of the loop gas 22 and to facilitate the desired polymerization conditions in the reactor 12.

As indicated, one or more static charge probes 40A, 40B, 40C, 40D, 40E (i.e., static charge probes) may be installed across the reactor 12 and/or along the loop gas circuit. The static probes may be of the voltage-type or current-type, for example. In voltage type probes, a charge is induced on the inner surface of the probe tip equal in magnitude, but of opposite polarity, to the charge carried by particles in the proximity of the probe tip. The portion of the charge induced on the probe varies with the location of the fluidized particles. The voltage induced on the probe is then measured and recorded. In current type probes, or contact probes, the fluidized particles transfer charge to the probe upon contact. The current developed by the charge transfer is then measured and recorded. Other static charge probe types may be employed.

Five static probes are depicted in the illustrated embodiment of FIG. 1. Three static probes 40A, 40B, 40C are installed along the reactor 12. Of these three probes set out in this example, two probes 40A, 40B are at the reaction zone 16 and one probe 40C at the disengagement zone 18. The two remaining probes 40D, 40E are disposed along the overhead of the reactor 12, with one probe 40D upstream of the cyclone 26 and one probe 40E downstream of the cyclone 26. Of course, other numbers and arrangements of static probes may be employed. The probes may be placed where their measurements and indication are more responsive to the presence and increase in fines, and to problems associated with fines.

Figure 2:
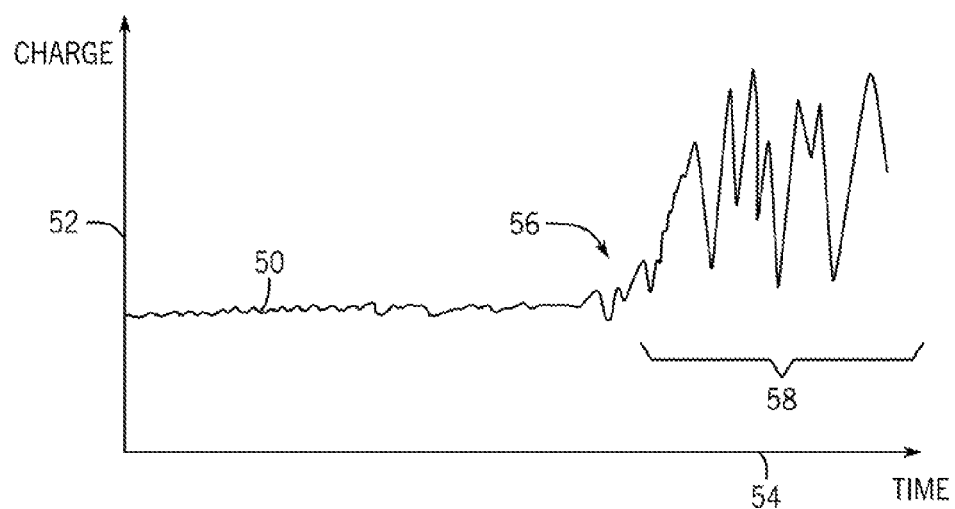
FIG. 2 is an exemplary conceptual plot of static charge measured in a gas phase reactor system via a static probe over time in accordance with embodiments of the present techniques.

FIG. 2 is a conceptual example of a static probe measurement over time in a reactor system 10. The probe may be disposed across the gas phase reactor 12 or in the overhead of the reactor 12, for example. FIG. 2 is a plot 50 of static charge 52 over time 54. Units of static measurement of the static probe may include coulomb (C), ampere (A), volt (V), elementary charge (e), and other units.

As can be seen in the exemplary conceptual plot 50, the measured static charge is initially relatively stable and then begins to trend increase, as indicated by reference numeral 56. The static probe measurement further shows a time period 58 of a static disturbance. Such a disturbance may be correlated with increased fines and/or onset of potential problems associated with fines, such as sheeting, carryover of fines into the overhead, fouling, plugging, and so on. Moreover, the values of static charge may be correlated with amounts of fines. In managing operation of the reactor system 10, static charge value limits and static charge value deviation limits may be specified so that when such limits are reached or met, a determination related to fines assessed and appropriate response implemented.

Returning to FIG. 1 and in view of the above discussion with regard to FIG. 2, the measurements obtained from the static probes 40A, 40B, 40C, 40D, 40E may be correlated to the conditions in the reactor 12 and reactor system 10 and therefore, can be used as basis for the control of the reactor 12 temperature and fluidization velocity to reduce the possibility of fouling in the reactor 12, in the overhead of the reactor 12, and/or in downstream equipment. Thus, an increased on-time stream factor of the reactor system 10 and reactor 12 may be realized, and maintenance costs associated with reactor system 10 and reactor 12 fouling and downtime reduced.

In one example, upon measurement of increased static charge or indication of a static disturbance, the reactor 12 temperature is decreased to reduce the probability of fouling. In other examples, upon measurement of increased static charge or indication of a static disturbance, the reactor 12 fluidization velocity is increased to reduce the potential for sheeting on the walls or dome of the gas phase reactor 12, or the reactor 12 fluidization velocity is decreased to decrease the carryover of fines into the overhead of the reactor 12 to reduce fouling of the cyclone 26, motive device 30, heat exchanger 34, and so forth. In yet another example, upon measurement of increased static charge or indication of a static disturbance, the antistat addition in the reactor system 10 is increased to reduce fines accumulation and/or reduce fouling associated with fines accumulation.

In the illustrated embodiment of FIG. 1, the static probe 40B is positioned at the reactor zone 16 such that the probe 40B contacts the fluidized bed 14 within the top twelve inches (one foot) of the fluidized bed 14. Operating experience has shown this location to be more responsive in giving static measurements indicating the presence of fines and upsets related to fines in the reactor 12. Notably, the space charge density generally increases through the fluidized bed 14 toward the top of the fluidized bed 14. In one calculation, the space charge density generally increased through a 56 feet bed height of a fluidized bed, with the greatest space charge density experienced at the top of the fluidized bed 14, or within the top foot (12 inches) of the fluidized bed 14.

Figure 3:
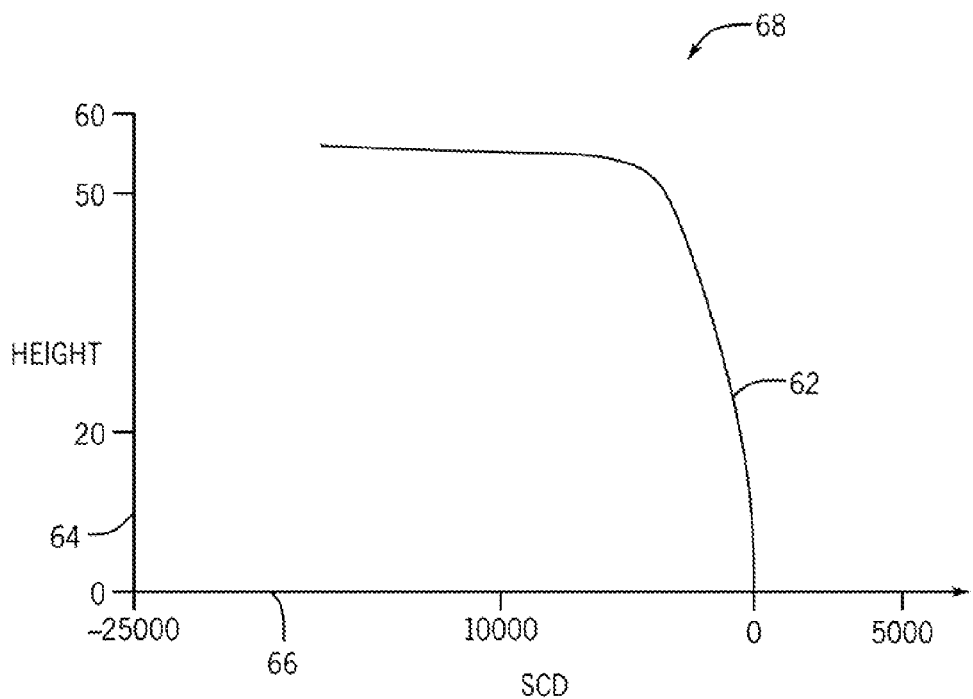
FIG. 3 is an exemplary plot of fluidized bed height versus static charge density based on an example calculation in accordance with embodiments of the present techniques.

FIG. 3 is an exemplary plot 62 for a polyolefin gas phase reactor of bed height 64 in feet of fluidized bed versus calculated space charge density 66 in Coulombs/cubic meter (C/m3). As shown, the absolute value of space charge density increases significantly toward the upper portion 68 (e.g., top foot) of the fluidized bed. The total height of the bed in this exemplary calculation is 56 feet, and the greatest space charge density is at 56 feet in this example. Greater space charge density generally gives more responsive static measurements with a static probe. A greater responsiveness of a static probe in the upper portion of the fluidized bed 14 has been confirmed with observed trends. For a discussion of the effect of particle size distribution on charging granular insulators, see for example the publication: Lacks, D J and Levandovsky, A., "Effect of particle size distribution on the polarity of triboelectric charging in granular insulator systems", J. Electrostatics, 65 (2007) 107-112, which is incorporated by reference herein in its entirety.

Figure 4:
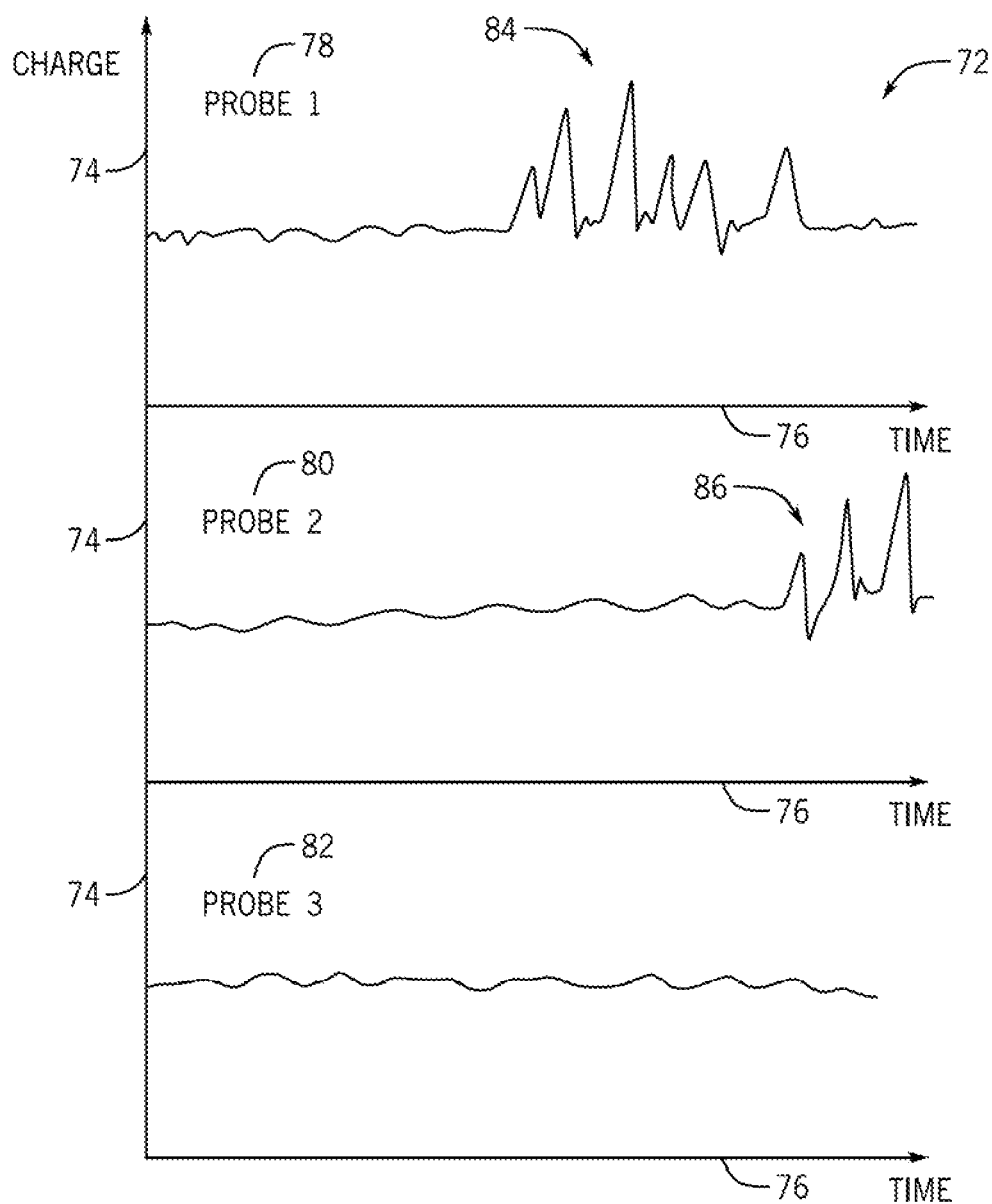
FIG. 4 is an exemplary conceptual plot of static charge measured in a gas phase reactor system via three static probes over time in accordance with embodiments of the present techniques.

FIG. 4 is a conceptual example plot 72 of the static measurements (static charge 74 over time 76) of three static probes 78, 80, 82 in an exemplary polyolefin reactor system. In this example, the first probe 78 (Probe 1) is more responsive than the second probe 80 (Probe 2) and the third probe 82 (Probe 3). The second probe 80 (Probe 2) is more responsive than the third probe 82 (Probe 3). The locations of the probes may be determined by space charge density calculations, operating experience including observed trends, and other factors.

In this example, the more responsive probe 80 (Probe 2) or most responsive probe 78 (Probe 1) may be a probe (e.g., the probe 40B of FIG. 1) measuring static charge in an upper portion of the fluidized bed 14, a probe (e.g., the probe 40C of FIG. 1) measuring static charge in the disengagement section 18, or a probe (e.g., the probe 40D of FIG. 1) measuring static charge in the overhead of the reactor 12, for instance. The less responsive probes such as with probe 82 (Probe 3) may be probes measuring static charge in a lower portion of the fluidized bed 14, for instance, or in certain portions of the reactor 12, and the like. Of course, other arrangements and sensitivity behavior may be realized. As indicated above with respect to FIG. 1, the installed locations of the probes may be across the reaction section 16 to contact the fluidized bed 14 (e.g., probes 40A, 40B of FIG. 1), at the disengagement section 18 (e.g., probe 40C of FIG. 1), in the overhead of the reactor 12 such as upstream and/or downstream of the cyclone 25 (e.g., probes 40D, 40E of FIG. 1), and the like.

As can be seen in the example of FIG. 4, the most responsive probe 78 (Probe 1) is first in time of the three represented probes to show a significant increase in static charge and a static disturbance 84. The second probe 80 (Probe 2) shows a significant increase in static charge and a static disturbance 86 later in time. The third probe 82 (Probe 3), which is the least responsive probe in this example, does not register a significant increase in static charge or a static disturbance in this time frame.

Returning to FIG. 1 and according to the present techniques, it is generally beneficial to locate static probes in fluidized beds at points of relatively greater calculated space charge density to increase measurement sensitivity during static disturbances. By locating static probes at points of increased sensitivity (e.g., at relatively high space charge density), the reactor operator or engineer will generally be able to respond and mitigate the static deviation sooner than by locating the static probes in other locations (e.g., at relatively low space charge density) in the fluidized bed 14. Again, these calculation results and behavior agree with exemplary observed trends in the operation of a gas phase reactor 12.

In addition to static charge measurements, other indications of potential or anticipated excessive fines and associated operating problems may include the catalyst 24 type or catalyst 24 system including cocatalyst, for example. Indeed, unfortunately, product type or product grade changes requiring a catalyst of a different catalyst type or a different catalyst system can result in a dissimilar amount of polyolefin and catalyst particles going overhead and recovered in the cyclones and other recycle equipment. It might be inefficient to change the bed 14 height, gas velocity, particle size, and reactor 12 pressure, for example, between every catalyst type or catalyst system. A more efficient technique may be to adjust the antistat to the reactor 12 or overhead equipment (e.g., around the overhead cyclone 26). A surprising result is that the antistat at higher concentrations lowers the amount of fines accumulation. Therefore, higher levels of antistat may be added for higher fines products. This may be the case even where the antistat lowers catalyst productivity which can reduce particle size of the polyolefin.

The illustrated embodiment of FIG. 1 depicts two antistat addition points with one addition point 42A at the reaction zone 16 to the fluidized bed 14, and another addition point 42B to the disengagement section 16. Additional antistat addition points may be employed, such as more addition points to the fluidized bed 14 and also to the reactor 12 overhead piping and equipment.

In addition to or in lieu of increased antistat addition, the operating conditions of the gas phase reactor 12 may be adjusted in response to a potential increase in fines anticipated for a catalyst 24 type or catalyst 24 system. For instance, when transitioning from one polyolefin grade to another polyolefin grade employing a different catalyst type (or different catalyst system) that may produce more fines, the operating conditions of the reactor 12 may be adjusted in response as the transition is being performed. The morphology and other properties of a particular catalyst 24 type or catalyst 24 system, and previous operating experience with the particular catalyst 24 type or catalyst 24 system, may indicate a potential increase in fines. A catalyst system may include the catalyst type, cocatalyst level or type, catalyst induction time, chrome loading, catalyst particle size, activation temperature, and so forth.

In all, for fines or anticipated fines indicated by static measurement, catalyst type, operating data, or other factors, the response may be to adjust antistat addition, adjust operating conditions, implement other adjustments, take the reactor off-line, shutdown the reactor, and so forth. Operating conditions that may be adjusted in response to an indication of fines may include fluidization velocity, reactor 12 temperature, product withdrawal ratio (between takeoffs 25A, 25B), and so forth, may be adjusted. With regard to fluidization velocity, the velocity may be decreased in anticipation of increased fines, such that fewer fines are carried overhead and also that the catalyst and fines remain longer in the fluidized bed increasing residence time and growth of the polyolefin particles. On the other hand, the fluidization velocity may be increased to decrease the chance of sheeting along the walls of the reactor 12. Adjustment of the product withdrawal ratio between product takeoffs 25A, 25B may beneficially reduce fine carryover and increase residence time. Further, a decrease in reactor 12 temperature may reduce sheeting or fouling. Such a reduction in temperature may be particularly beneficial when transitioning to a catalyst type that gives increased fines, for instance, or to a polyolefin grade more susceptible to fouling.

The aforementioned determinations and adjustments may be implemented with a control system 44. Indeed, the control system 44 may perform calculations and along with process valves, for instance, facilitate control of process variables in the polyolefin reactor system 10, automatically and/or manually, and so on. In general, a control system 44, such as a processor-based system, may facilitate management of a range of operations in the reactor system 10, such as those represented in FIG. 1.

Polyolefin manufacturing facilities may include a central control room or location, as well as a central control system, such as a distributed control system (DCS) and/or programmable logic controller (PLC). The reactor system 10 typically employs a control system 44 that is a processor-based system, such as a DCS, and may also employ advanced process control known in the art. Other operations of the polyolefin manufacturing facility may also be controlled via the control system 44 comprising a DCS (or PLC). In the control system 44, computer-readable media may store control executable code to be executed by associated processors including central processing units, and the like. Such code executable by the processor(s) may include logic to facilitate the operations described herein.

In fact, the control system 44 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system 44 where the measured data may be read by an operator and/or used as an input in various control functions or calculations by the control system 44. Depending on the application and other factors, indication of the process variables may be read locally or remotely by an operator, and/or used for a variety of control purposes via the control system 44.

The control system 44 may be wired and/or wireless, and offer the advantage of centralized control, while retaining the capability of distributed or local control. Components may include instrumentation, remote transmitters, remote control panels (e.g., remote transmission units or RTU's), input/output (I/O) devices, communications medium (e.g., cable or wireless links, network, etc.), central control panel or facility, and so forth. The remote control panels, I/O devices, and other translation devices may interface with the process or equipment on one side, while interfacing with the control system 44 on the other. Moreover, as indicated, the control system 44 typically includes hardware/software for control, interface, database management, and so on. In operation, the control system 44 may transfer data and commands using communication protocols such as Ethernet or other open standards, or a proprietary standard, depending upon the DCS vendor, for example.

A polyolefin manufacturing facility typically has a control room from which the plant manager, engineer, technician, supervisor and/or operator, and so on, monitors and controls the process. When using a DCS control system 44, the control room may be the center of activity, facilitating the effective monitoring and control of the process or facility. The control room and DCS control system 44 may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

In the illustrated embodiment of FIG. 1, the control system 44 (e.g., DCS) facilitates control of the polyolefin reactor system 10. As indicated above, such a control system 44 may interface with equipment, valves, actuators, instrumentation including sensors and transmitters, and so forth, in the reactor system 10. Such equipment may include pumps, compressors, reactors, vessels, and so on. The control system 44 may include the appropriate hardware (e.g., processor, memory, etc.), software logic including code (e.g., stored on the memory) executable by the processor, to facilitate measurement and control of process variables, to perform calculations related to measured data and so on, to implement control schemes including adjustment of operating conditions, to instruct and set actuator positions and the open/close position of valves, the settings of a compressor, and the like.

Figure 5:
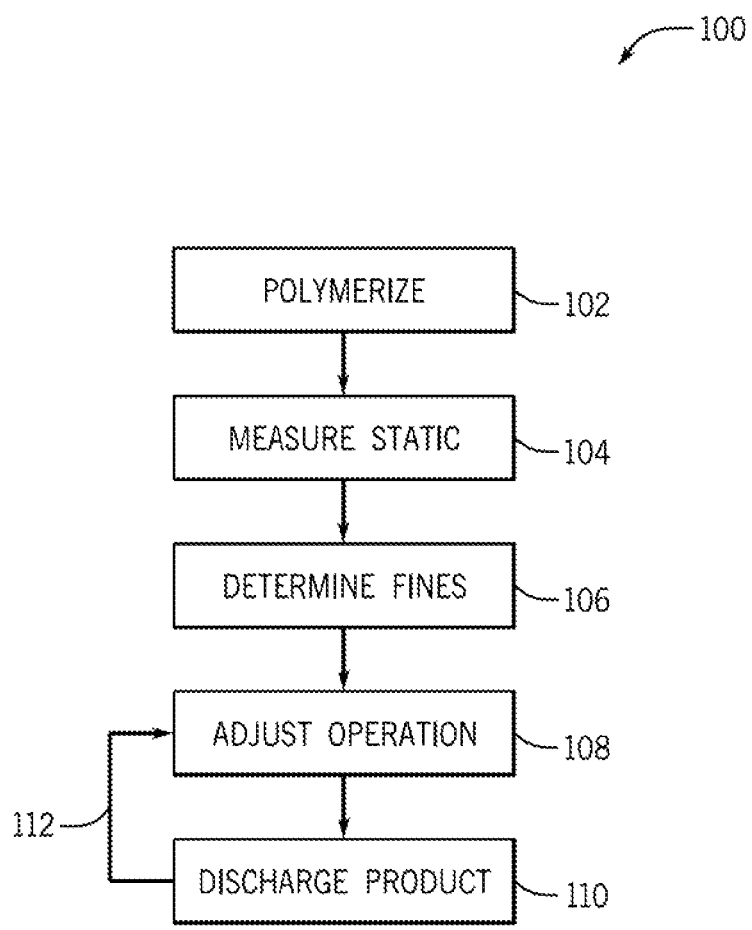
FIG. 5 is a block flow diagram of an exemplary method of operating a polyolefin gas phase reactor system in accordance with embodiments of the present techniques.

FIG. 5 is a method 100 of operating a reactor system having a gas phase reactor. In the gas phase reactor, olefin (e.g., ethylene) is polymerized (block 102) into a polyolefin (e.g., polyethylene) in the presence of a catalyst. Static charge (static electricity) in the reactor system is measured (block 104). The static charge may be measured with one or more static probes, for example. Static probes may be disposed along the gas phase reactor and/or in the overhead of the gas phase reactor. Based on the measured static charge (e.g., via static probes), an indication of polyolefin fines in the reactor system may be determined (block 106). The indication of polyolefin fines may include an indication of polyolefin fines accumulation, for example. Fines accumulation can be the increased presence of free fines, or the accumulation (including adhering) of fines to the reactor walls or to equipment or piping in the reactor overhead system, for instance.

The determined (block 106) indication of polyolefin fines may be an increased amount or anticipated increased amount of fines based on increased values of measured static charge and/or due to a measured disturbance of static charge (static electricity) in the reactor system. The determined indication may be an indication of current problems, the onset of problems, or anticipated problems associated with or related to the presence of fines based on increased values of measured static charge and/or based on a measured static disturbance. The problems may include sheeting or fouling, for example. Typical onset of an operability problem associated with or related to polyolefin fines accumulation may be further indicated by deviation of reactor wall temperature from reactor bulk temperature, deviation of reactor grid plate temperature from reactor bulk temperature, unexpected decrease in fluidized bulk density, and so on.

In addition to or in lieu of measured static charge, additional example bases for the determination (block 106) of these indications of polyolefin fines may be the catalyst type or catalyst system of the catalyst in the polymerization, for instance, as well as operating conditions of the reactor and reactor overhead system, and the like. Other bases for the indication of polyolefin fines or polyolefin fines accumulation could be differential pressure measurements through the reactor or reactor overhead, lab or online particle size measurements of polyolefin samples collected from the reactor or reactor overhead, and so forth.

With regard to catalyst type, during a transition to a second catalyst of a second catalyst type different than the first catalyst type, the determination (block 106) may involve determining an indication of an anticipated amount polyolefin fines in the reactor system in view of the second catalyst type or second catalyst system. Such a determination may be based on catalyst type properties and/or previous operating experience with catalyst types or catalyst systems. A catalyst system may include catalyst type, cocatalyst level or type, catalyst induction time, chrome loading, catalyst particle size, activation temperature, and so forth.

In response to the determination (block 106) of an indication of fines in the reactor system, whether by measuring static charge, assessing catalyst type or catalyst system, or other factors, the operation of the reaction system may be adjusted (block 108). A control system may make the determination (block 106) and/or facilitate the adjustment (block 108). The adjustment (block 108) may include adjusting a rate of antistat addition to the reactor system. In embodiments, such adjustments of antistat addition rate or other adjustments may be performed automatically by the control system in response to the determined indication of polyolefin fines including polyolefin fines accumulation (based on measured static charge and other factors). The rate of antistat addition may be adjusted at a particular location in the reactor system or generally to the reactor system. The addition rate of antistat may be adjusted in response to a measured change in static charge or a measured static disturbance.

The adjustment (block 108) may include adjusting operating conditions of the reactor system or gas phase reactor, such as adjusting fluidization velocity through the fluidized bed (polyolefin and the catalyst) in the gas phase reactor. The fluidization velocity may be adjusted via the loop gas rate with valves and/or compressor, for example. Further, reactor temperature is an operating condition that may be beneficially adjusted (block 108) in response (block 106) to the determination of the indication of fines.

Additionally, the method 100 includes discharging (block 110) product polyolefin from the gas phase reactor in at least an upper product stream and a lower product stream, wherein the upper product stream discharges from an upper portion of a fluidized bed, and the lower product stream discharges from a lower portion of the fluidized bed. The product streams may discharge from the gas phase reactors through respective lock hoppers, for example. Further, as indicated by reference numeral 112, the adjusting (block 108) may include adjusting a ratio of the rate of polyolefin withdrawal via the upper product stream versus a the rate of polyolefin withdrawal via the lower product stream.

With regard to FIGS. 1-5, a control system (e.g., the control system 44 depicted in FIG. 1), as indicated, may automatically assess and determine polyolefin fines and polyolefin fines accumulation in the reactor system 10. As also discussed, the control system 44 may include a processor, memory, and logic or code stored on the memory and executable by the processor, to make the assessment and determination. Embodiments of the present techniques uniquely provide for defining in the control system both absolute and deviation limits of the measured static charge that characterized the assessment or indication of polyolefin fines and their accumulation in the reactor system 10, including in the reactor 12 and in the overhead system (e.g., cyclone 26, motive device 30, etc.) of the reactor 12. As discussed, the measure static charge may be indicated by static charge probes 40A, 40B, 40C, 40C, 40E, other static charge probes, and/or other static charge measuring devices. Signal(s) of the static charge measurement indications may be received by the control system 44.

In addition to measured static charge values and behavior, other inputs to the control system 30 related to fines and fines accumulation may be reactor system operating variables (via sensors and/or calculated) such as temperature, pressure, fluidization velocity, particle size distribution and/or physical property analyses results of polyolefin samples from the reactor system, and so forth. The control system 44 may be programmed with limits and thresholds related to these additional inputs. In all, the control system 40 receives information about and from the reactor system 10, and based on predefined and/or learned values, limits, thresholds, etc., automatically assesses and determines an indication of polyolefin fines including polyolefin fines accumulation in the reactor 12 and reactor system 10.

Further, the control system 44 may also subsequently automatically adjust operation of the reactor system 10 in response the assessment and determination of fines and fines accumulation. The control system 44 may be programmed to adjust the antistat addition rate (at respective locations), fluidization velocity, reactor temperature, and other operating variables. The adjustments including their magnitude may be related to correlations predefined and/or learned by the control system, such correlations relating fines and fines accumulation behavior with antistat addition rate and other operating variables. Other configurations with respect to the control system 44 may be accommodated.

Figure 6:
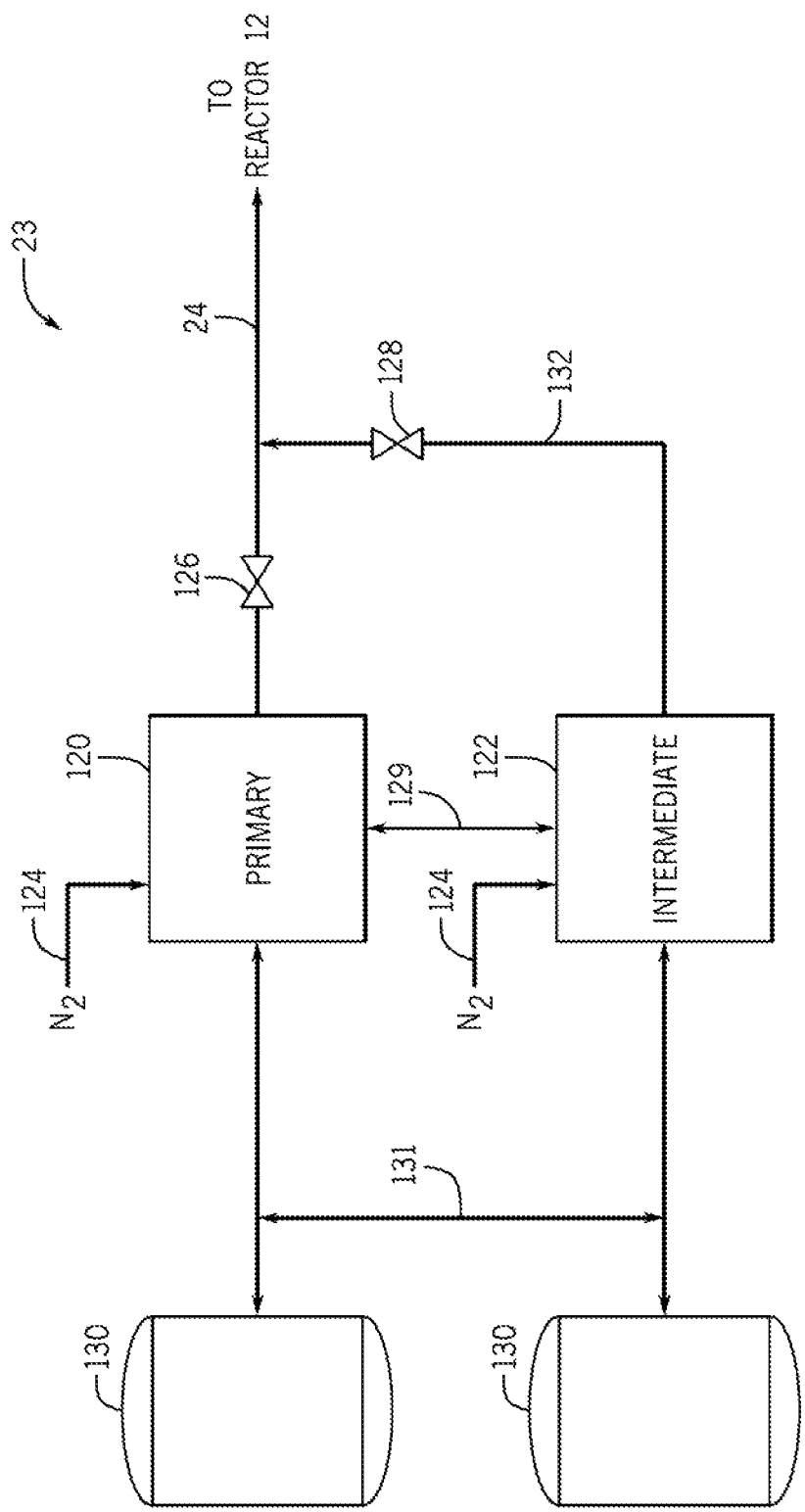
FIG. 6 is a simplified process flow diagram depicting an exemplary catalyst supply system for the gas phase reactor system of FIG. 1 in accordance with embodiments of the present techniques.

FIG. 6 is an exemplary catalyst feed system 23 to provide the catalyst 24 to the gas phase reactor 12 (FIG. 1). In the illustrated embodiment, the catalyst feed system 23 has a primary feed vessel 120 and an intermediate feed vessel 122. In this example, nitrogen and its pressure is used to drive the catalyst 24 from the hoppers 120 and 122 to the reactor 12. In operation, various valves including exemplary valves 126 and 128 may be aligned to source a particular vessel 120 or 122 to provide catalyst 24 feed to the gas phase reactor 12.

A typical operation may be to feed catalyst 24 from the primary catalyst feed vessel 120, and to charge catalyst to the primary catalyst feed vessel 120 through the intermediate catalyst feed vessel 122 and piping 129. The intermediate catalyst feed vessel 122 may be used to temporarily feed catalyst 24 to the reactor 12 during a transition to a different catalyst. The catalyst feed system 23 includes one or more upstream catalyst feed tanks 130 that provide catalyst 24 to the vessels 120 and 122. In certain examples, the feed tanks 130 are configured to supply the intermediate vessel 122 and not the primary vessel 120, though the catalyst contents of the primary vessel 120 can be blown or transferred back to a feed tank 130. In those examples, the primary vessel 120 receives catalyst from the intermediate vessel 122. The catalyst feed tanks 130 may have associated interoperation piping, as indicated by reference numeral 131, to provide operational flexibility between the one or more catalyst feed tanks 130.

Again, certain operations may encompass to supply catalyst from a catalyst feed tank 130 to the intermediate vessel 122 which supplies the primary vessel 120 with catalyst. In these examples, the bypass line 132 may be primarily used in catalyst transitions from the first type to the second type of catalyst. In specific examples, catalyst is not supplied from a catalyst tank 130 to the primary vessel 120, but a catalyst tank 130 can receive catalyst from the primary vessel 120. However, various other configurations and operational flexibility may be realized including supplying catalyst from a catalyst feed tank 130 to the primary vessel 120.

When transitioning from producing a first polyolefin grade to a second polyolefin grade in the gas phase reactor 12, a different catalyst type may be required for the second polyolefin grade. In other words, the second polyolefin grade may require a catalyst 24 of a catalyst type that is different than the catalyst type of the catalyst 24 used in the polymerization for the first polyolefin grade. Advantageously, the intermediate catalyst vessel 122 and a bypass line 132 provide for flexibility to transition from a first catalyst 24 type to a second catalyst 24 type without interrupting or discontinuing the polymerization in the gas phase reactor 12. While some off-spec production of polyolefin may unfortunately be realized during the transition, the polymerization continues and the gas phase reactor 12 can beneficially remain online during the transition, reducing off-spec production, providing operational stability, and avoiding a shutdown and restart of the reactor 12.

In operational embodiments, a catalyst feed tank 130 having a first catalyst provides a batch of first catalyst to the intermediate catalyst feed vessel 122. When the primary catalyst feed vessel 120 is empty, or nearly empty, a charge of first catalyst is transferred from the intermediate catalyst feed vessel 122 to the primary catalyst feed vessel 120. The primary catalyst vessel 120 supplies first catalyst as the catalyst 24 to the reactor 12. When desired to make a transition to a second catalyst as the catalyst 24 for the polymerization in the reactor 12, the intermediate catalyst feed vessel 122 is charged with the second catalyst from a catalyst feed tank 130. To begin the polymerization with the second catalyst, valves including valves 126 and 128 are arranged such that the first catalyst flow to the reactor 12 from the primary vessel 120 is discontinued, and flow of second catalyst to the reactor 12 through the bypass line 132 from the intermediate vessel 122 is started. Thus, a shutdown of the reactor 12 for the catalyst or polyolefin grade transition may be avoided.

While the intermediate vessel 122 is feeding the second catalyst to the reactor 12, the primary vessel 120 is prepared to feed the second catalyst. To prepare the primary vessel 120, the primary vessel 120 is emptied of any first catalyst, such as by blowing back (via nitrogen 124 pressure) the first catalyst from the primary vessel 120 to a catalyst feed tank 130. The primary vessel 120 is then filled with the second catalyst by transferring or blowing (via nitrogen 124 pressure) second catalyst from the intermediate vessel 122 to the primary vessel 120, such as through piping 129.

Once filled or partially-filled with second catalyst, the primary vessel 120 may then supply the second catalyst as the catalyst 24 to the reactor 12. In other words, the valves including exemplary valves 126 and 128 are arranged or operated such that flow from the intermediate vessel 122 through the bypass line 132 is discontinued, and second catalyst flow from the primary vessel 120 (e.g., through valve 126) as the catalyst 24 to the reactor 12 is initiated and established. Thus, the reactor 12 may remain online during the catalyst transition (and polyolefin product grade or type transition). Again, thus beneficially, the on-time stream factor of the reactor 12 may be increased, off-spec production of polyolefin reduced, and/or maintenance costs reduced. Lastly, alternative operational arrangements with the catalyst supply system 23 may be realized with the configuration flexibility of the system 23.

Figure 7:
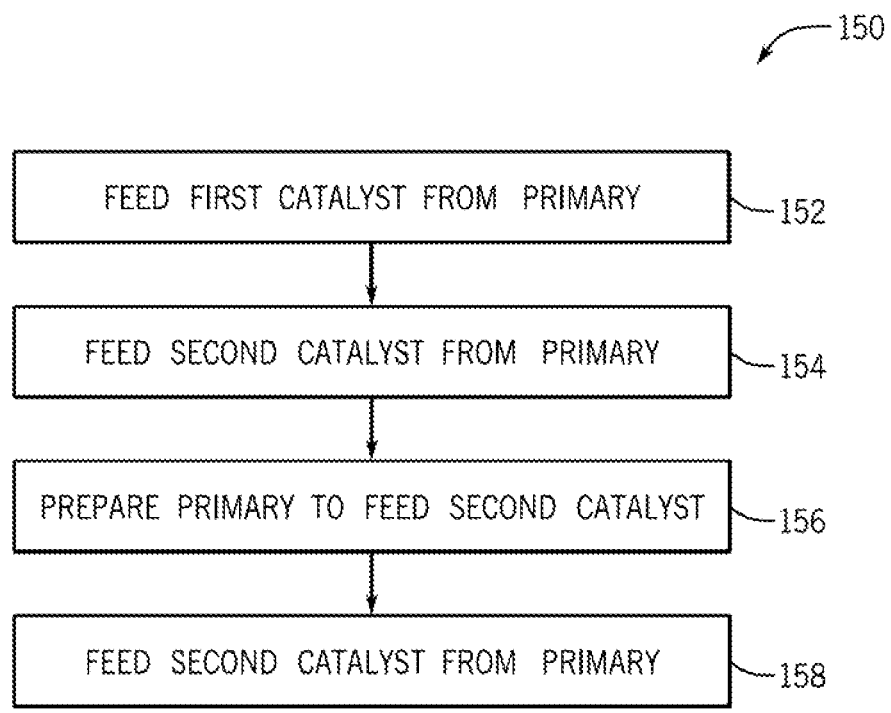
FIG. 7 is a block flow diagram of an exemplary method of operating the catalyst supply system of FIGS. 1 and 6 in accordance with embodiments of the present techniques.

FIG. 7 is an exemplary method 150 of supplying catalyst to a gas phase reactor for polymerization of olefin into a polyolefin in the gas phase reactor. The method 150 involves transitioning from a first catalyst to a second catalyst, including without interrupting or discontinuing the polymerization in the gas phase reactor.

Initially, a first catalyst is fed (block 152) from a primary vessel (e.g., primary hopper, primary run tank, etc.) to the gas phase reactor. When desired to transition to supply of a second catalyst to the gas phase reactor, flow of first catalyst from the primary vessel to the gas phase reactor is discontinued. Flow of second catalyst from an intermediate vessel (e.g., intermediate hopper, intermediate run tank, bypass charge tank, etc.) through a bypass line to the gas phase reactor is initiated (block 154). Thus, to start the transition, the first catalyst feed from the primary vessel to the reactor is stopped, and the second catalyst is fed (block 154) from the intermediate vessel to the reactor.

During feed (block 154) of the second catalyst from the intermediate vessel to the reactor, the primary vessel is prepared (block 156) with second catalyst. In particular, the primary vessel is emptied of any first catalyst, such as by transferring first catalyst from the primary vessel to an upstream catalyst tank, and second catalyst is added to the emptied primary vessel. Second catalyst may be provided to the primary vessel from the intermediate vessel, a catalyst tank, or other source. A benefit of providing the second catalyst from the intermediate vessel to the primary vessel is the consistency of using the catalyst charge that is currently being fed to the reactor from the intermediate vessel. Lastly, to complete the transition, flow of second catalyst is established (block 158) from the primary vessel to the gas phase reactor. Advantageously, in embodiments, the transition does not interrupt the polymerization or require that the gas phase reactor shutdown or go offline.

In summary, embodiments of the present techniques provide for operating a reactor system having a gas phase reactor, including polymerizing olefin (e.g., ethylene) in the gas phase reactor into a polyolefin (e.g., polyethylene) in presence of catalyst, measuring static charge in the reactor system, determining an indication of polyolefin fines (including an polyolefin fines accumulation) in the reactor system based at least on the measured static charge (e.g., via static probes), and adjusting operation of the reactor system in response to the indication. The static charge may be measured in the in the top 12 inches of a fluidized bed (of the polyolefin and the catalyst) in the gas phase reactor, for example, as well as at other locations across the reactor and in the overhead of the reactor. In general, static probes may disposed at and measure static charge at an upper portion (e.g., top 12 inches) and/or lower portion of a fluidized bed in a reaction section of the gas phase reactor, in a disengagement section of the gas phase reactor, in the overhead of the reactor, and at other positions.

The indication of fines may be an indication of anticipated polyolefin fines, a change or anticipated change in amount of polyolefin fines, and/or the onset of an operability problem in the reactor system associated with polyolefin fines, and the like. The indication of polyolefin fines may be an indication of polyolefin fines accumulation. Moreover, the indication may be based on the measured static charge and/or the transition to a different catalyst type (i.e., from a first catalyst type to a second catalyst type) or to a different catalyst system (i.e., from a first catalyst system to a second catalyst system), for instance. The adjusting operation in response may include adjusting a rate of antistat addition to the reactor system, adjusting fluidization velocity through the fluidized bed in the gas phase reactor, adjusting reactor temperature, adjusting product withdrawal ratios (see paragraph below), and so on. Both the determination of polyolefin fines or polyolefin fines accumulation, and the adjusting of the operation, may be performed automatically via a control system.

As for product polyolefin discharge, the polyolefin from the gas phase reactor in at least an upper product stream and a lower product stream, wherein the upper product stream discharges from an upper portion of a fluidized bed, and the lower product stream discharges from a lower portion of the fluidized bed. In this example, adjusting operation in response to the indication of fines may include adjusting a ratio of a first rate of polyolefin withdrawal via the upper product stream versus a second rate of polyolefin withdrawal via the lower product stream.

A new catalyst supply system may provide for feeding the catalyst from a primary vessel to the gas phase reactor, initiating a transition to a different catalyst (e.g., from a first catalyst type or system to a second catalyst type or system) for the polymerization in the gas phase reactor (e.g. to produce a different polyolefin grade), feeding the different catalyst from an intermediate vessel to the gas phase reactor, and preparing the primary vessel to feed the different catalyst to the reactor. Beneficially, the transition may not interrupt the polymerizing in the gas phase reactor.

Embodiments provide for a polyolefin reactor system including a gas phase reactor to polymerize olefin into a polyolefin in presence of a catalyst, and a static probe (at least one static probe) to measure static electricity in the gas phase reactor. The static probe may be disposed at a reaction zone of the gas phase reactor. In instances, the static probe may measure static electricity at a point in a top foot (12 inches) of a fluidized bed in the gas phase reactor. A static probe may be disposed at a disengagement section of the gas phase reactor. A static probe may be disposed on overhead piping from the gas phase reactor. Indeed, one or more probes may be disposed in the overhead system of the reactor (e.g., along piping upstream and/or downstream of an overhead cyclone).

A control system determines an indication of polyolefin fines in the gas phase reactor based on the measured static electricity. The indication may be a disturbance of the static electricity, an amount or change in amount of polyolefin fines, and/or an anticipated onset of an operating problem associated with polyolefin fines. The control system may further determine an indication of anticipated polyolefin fines in the polyolefin reactor system based on a transition to a different catalyst.

The control system adjusts an addition rate of antistat to the gas phase reactor in response to the indication. The control system may also adjust reactor temperature and/or fluidization velocity through a fluidized bed (of polyolefin and catalyst) in the gas phase reactor.

As for product polyolefin withdrawal, a first lock hopper may be disposed at a first location along a reaction zone of the gas phase reactor for a first product withdrawal of the polyolefin from the gas phase reactor. A second lock hopper may be disposed at a second location along a reaction zone for a second product withdrawal of the polyolefin from the gas phase reactor. In this example, the control system is configured to adjust a ratio of a first rate of the first product withdrawal to a second rate of the second product withdrawal in response to the indication of polyolefin fines.

Further, a catalyst feed system may feed the catalyst to the gas phase reactor and to transition to feeding a different catalyst to the gas phase reactor without interrupting the polymerizing of the olefin to a polyolefin in the gas phase reactor. In certain examples, a primary vessel feeds the catalyst to the gas phase reactor, and an intermediate vessel feeds a different catalyst to the gas phase reactor while the primary vessel is being prepared to feed the different catalyst to the gas phase reactor.

Lastly, embodiments include a reactor system having a gas phase reactor to polymerize olefin into a polyolefin in presence of a catalyst, and an overhead system to receive overhead gas from the gas phase reactor, the overhead gas typically having entrained polyolefin fines from the gas phase reactor. A plurality of static charge probes measure static charge at different locations in the reactor system. A control system detects polyolefin fines accumulation in the reactor system based on the measured static charge, and the control system adjusts an addition rate of antistat to the reactor system in response to detecting polyolefin fines accumulation. Detecting polyolefin fines accumulation may include anticipating polyolefin fines accumulation in the reactor system (including based on a transition to a different catalyst for polymerizing the olefin into the polyolefin). Detecting polyolefin fines accumulation may involve the control system receiving from one or more of the static charge probes an indication of a static electricity disturbance in the reactor system. Fines accumulation can be the increased presence of free fines, or the accumulation (including adhering) of fines to the reactor wall and/or to equipment or piping in the reactor overhead system, for instance.

What is claimed is:

1. A polyolefin reactor system comprising:
a gas phase reactor configured to polymerize olefin into a polyolefin in presence of a catalyst;
a static charge probe configured to measure static electricity in the gas phase reactor; and
a control system configured to determine polyolefin fines accumulation in the gas phase reactor based on the measured static electricity and anticipated polyolefin fines accumulation in the gas phase reactor based on a transition to a different catalyst, and the control system configured to adjust an addition rate of antistat to the gas phase reactor in response to the determination.

2. The polyolefin reactor system of claim 1, wherein the static charge probe is disposed at a disengagement section of the gas phase reactor.

3. The polyolefin reactor system of claim 1, wherein the static charge probe is disposed at a reaction zone of the gas phase reactor.

4. The polyolefin reactor system of claim 1, wherein the static charge probe is configured to measure static electricity at a point in a top twelve inches of a fluidized bed in the gas phase reactor.

5. The polyolefin reactor system of claim 1, wherein the static charge probe is disposed on overhead piping from the gas phase reactor.

6. The polyolefin reactor system of claim 1, wherein the determination of polyolefin fines accumulation comprises a disturbance of the static electricity indicated by the static charge probe.

7. The polyolefin reactor system of claim 1, wherein the determination of polyolefin fines accumulation comprises a change in amount of polyolefin fines.

8. The polyolefin reactor system of claim 1, wherein the determination of polyolefin fines accumulation comprises an anticipated onset of an operating problem related to polyolefin fines.

9. The polyolefin reactor system of claim 1, wherein the control system is configured to adjust fluidization velocity through a fluidized bed in the gas phase reactor, and wherein the fluidized bed comprises the polyolefin and the catalyst.

10. The polyolefin reactor system of claim 1, comprising:
a first lock hopper disposed at a first location along a reaction zone of the gas phase reactor for a first product withdrawal of the polyolefin from the gas phase reactor; and
a second lock hopper disposed at a second location along a reaction zone for a second product withdrawal of the polyolefin from the gas phase reactor, wherein the control system is configured to adjust a ratio of a first rate of the first product withdrawal to a second rate of the second product withdrawal in response to the indication of polyolefin fines accumulation.

11. The polyolefin reactor system of claim 1, comprising a catalyst feed system configured to feed the catalyst to the gas phase reactor and to transition to feeding a different catalyst to the gas phase reactor without interrupting the polymerizing of the olefin to a polyolefin in the gas phase reactor.

12. The polyolefin reactor system of claim 1, comprising:
a primary feed vessel configured to feed the catalyst to the gas phase reactor; and
an intermediate feed vessel configured to feed a different catalyst to the gas phase reactor while the primary feed vessel is being prepared to feed the different catalyst to the gas phase reactor.

13. A reactor system comprising:
a gas phase reactor configured to polymerize olefin into a polyolefin in presence of a catalyst;
an overhead system configured to receive overhead gas from the gas phase reactor, the overhead gas having entrained polyolefin fines from the gas phase reactor;
a plurality of static charge probes configured to measure static charge at different locations in the reactor system; and
a control system configured to detect polyolefin fines accumulation in the reactor system based on the measured static charge and anticipated polyolefin fines accumulation in the reactor system based on a transition to a different catalyst, and the control system configured to adjust an addition rate of antistat to the reactor system in response to the detecting polyolefin fines accumulation.

14. The reactor system of claim 13, wherein detecting polyolefin fines accumulation comprises receiving an indication of a static electricity disturbance in the reactor system from one or more of the static charge probes.

15. A polyolefin reactor system comprising:
a gas phase reactor configured to polymerize olefin into a polyolefin in presence of a catalyst;
a catalyst feed system configured to feed the catalyst to the gas phase reactor and to transition to feeding a different catalyst to the gas phase reactor without interrupting the polymerizing of the olefin to a polyolefin in the gas phase reactor;
a static charge probe configured to measure static electricity in the gas phase reactor; and
a control system configured to determine polyolefin fines accumulation in the gas phase reactor based on the measured static electricity and to adjust an addition rate of antistat to the gas phase reactor in response to the determination.

16. The polyolefin reactor system of claim 15, wherein the determination of polyolefin fines accumulation comprises a disturbance of the static electricity indicated by the static charge probe.

17. The polyolefin reactor system of claim 15, wherein the determination of polyolefin fines accumulation comprises a change in amount of polyolefin fines.

18. The polyolefin reactor system of claim 15, wherein the determination of polyolefin fines accumulation comprises an anticipated onset of an operating problem related to polyolefin fines.

19. The polyolefin reactor system of claim 15, wherein the control system is configured to adjust fluidization velocity through a fluidized bed in the gas phase reactor, and wherein the fluidized bed comprises the polyolefin and the catalyst.

* * * * *